United States Patent [19]
Kanayama et al.

[11] 3,811,772
[45] May 21, 1974

[54] FILM REPRODUCTION DEVICE

[75] Inventors: Mitsutoshi Kanayama; Motofumi Konishi, both of Tokyo, Japan

[73] Assignee: Canon Kabushiki Kaisha, Tokyo, Japan

[22] Filed: Feb. 27, 1973

[21] Appl. No.: 336,380

[30] Foreign Application Priority Data
Mar. 3, 1972 Japan............................. 47-22139

[52] U.S. Cl.............................. 355/111, 355/106
[51] Int. Cl..................... G03b 27/10, G03b 27/30
[58] Field of Search ............ 355/97, 104, 106, 108, 355/111

[56] References Cited
UNITED STATES PATENTS
| | | | |
|---|---|---|---|
| 2,990,762 | 7/1961 | Baumbach et al. | 355/111 |
| 3,658,418 | 4/1972 | Mastroianni et al. | 355/104 X |
| 3,160,086 | 12/1964 | Davis | 355/111 |
| 3,582,207 | 6/1971 | Johnson et al. | 355/106 X |

Primary Examiner—Fred L. Braun
Attorney, Agent, or Firm—Fitzpatrick, Cella, Harper & Scinto

[57] ABSTRACT

A high speed film reproduction device for reproducing an information image recorded on an original film onto a reproduction film, including a first original film drive assembly mounted ahead of an exposure assembly with respect to the travelling direction of the original film, a second original film drive assembly mounted subsequent to the exposure assembly with respect to the travelling direction of the original film, and drive control apparatus for selectively equalizing the driving forces of the drive assemblies or setting the driving force of the first drive assembly smaller than that of the second drive assembly.

5 Claims, 7 Drawing Figures

FILM REPRODUCTION DEVICE

BACKGROUND OF THE INVENTION

1. Field of the Invention

The invention is directed to the field of reproduction devices which perform reproducing by contact of an original film with a reproduction film, and more particularly to an improved device which can be operated at a high speed without producing a double-image even during high speed operation.

2. Description of the Prior Art

In microphotography, it is possible to take a number of copies of an original film easily and at a low cost by reproducing an original film on a reproduction film by a contact print method. When the same microfilm is distributed to many people, and when the film is breakable because of the high frequency of use, or when the important film is stored in a separate place, in order to minimize the risk of possible calamities, it is necessary to make a reproduced film from the original film. The use of reproduced microfilms expands the range of application and allows the films to be widely utilized.

In the reproduction of microfilms, a microfilm of the same size (equimultiple) and having the same content as that of the original film, is made from the original film or other known microfilm, by means of a contact method. Specifically, an exposure is accomplished by continuously transporting an original film having an information recorded image in contact with an unexposed film, and then the exposed film is subjected to developing and fixing treatments to obtain a desired reproduced film.

Various prior art reproduction films have a disadvantage because the sensitivity of film is low so that the reproduction speed is slow, thereby making it impossible to perform a reproduction treatment at a high speed.

With the recent progress of photographic technology, new reproduction films have been developed and are available for practical use, which can be treated at high speeds. Thermal development films, for use as a reproduction film, such as diazo film, "Kalver" film (of Kalver Company), and "Dry Silver" film (of Minesota Mining & Manufacturing Company) can be treated at a high speed. The diazo film is formed by coating sensitive diazo compound as well as coupler on a film base of acetate resin or polyethylene. The "Kalver" film is formed by coating thermoplastic resin with ultraviolet sensitive material uniformly dispersed on a film of polyester, and said sensitive layer is exposed with an ultraviolet ray and thereafter heated to form a bubble image. The "Dry Silver" film is formed by coating organic silver salt, silver halide and the like on a film of polyester. These thermal development films are treated in a process entirely different from a conventional wet system treatment and all of them are treated by a drying system, that is to say, by exposure and thermal development.

However, when these thermal development films are reproduced at a high speed, there is given rise to various problems which do not occur in the conventional reproduction process at a low speed. Particularly, if a conventional reproduction device for thermal development films operated at a relatively low speed is merely driven at a high speed, a double image of the image recorded on the original film is disadvantageously produced on a reproduced film. That is, according to the conventional film reproduction device, there are an original film feed reel and a take-up reel, to which motors for driving said reels are connected so as to have the same torque for both motors. These two motors are adapted to be run in different directions so that the reproduction film may be stretched to a given tension between the feed reel and the take-up reel. The original film is in contact with the reproduction film at the exposure portion, and these films are transported by driving the original film, while maintaining said contact condition at the exposure portion.

However, when the film is treated at high speed, the torque of the motor driving the original film feed reel acts as a load during the film travelling operation. This is the cause of the occurrence of the double-image, because a slip phenomenon is produced between the reproduced film and the original film at the exposure portion during the high speed operation. Also, since the reproduction film and the original film are films made of synthetic resin, a slip phenomenon is produced between these films at the exposure portion during the high speed operation, which produces a double-image on the reproduced film.

SUMMARY OF THE INVENTION

An object of the invention is to eliminate the prior art disadvantages noted above.

Another object of the invention is to provide a reproduction device which accurately reproduces an information image recorded on the original film onto the reproduced film.

A further object of the invention is to provide a film reproduction device which is able to reproduce and treat at a high speed an original film and a reproduction film.

Still another object of the invention is to provide a film reproduction device which promotes follow characteristics of the original film relative to the reproduction film.

A further object of the invention is to provide a reproduction device which produces no double-images on the reproduction film during the reproduction operation at a high speed.

A further object of the invention is to provide a device, comprising first driving means mounted frontwardly of exposure means with respect to a travelling direction of an original film and adapted to transmit the driving force to the original film by which the original film is driven in a direction reverse to the travelling direction, second driving means mounted rearwardly of the exposure means with respect to said travelling direction and adapted to transmit the driving force to the film, by which said film is driven in said transporting direction, and drive controlling means which equalizes the driving force of both driving means during the stoppage of said film and makes the driving force of the first driving means smaller than that of the second driving means during the time of transporting the film, whereby during the stoppage of the reproduction operation the original film stops by action of a suitable tension, while during the time of reproduction operation the original film and the reproduction film are travelling at the same speed.

Other objects of the invention will be understood upon perusal of the following detailed description of certain specific embodiments with reference to the accompanying drawings.

DESCRIPTION OF THE PREFERRED EMBODIMENTS

Figure 1:
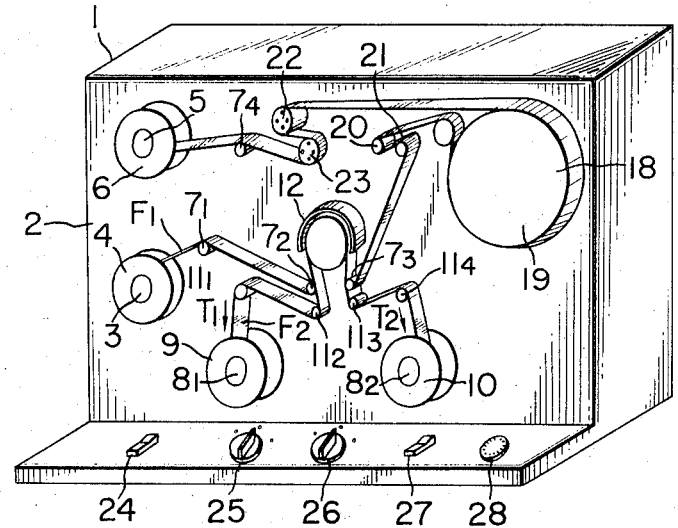
FIG. 1 is a perspective view of a film reproduction device according to the present invention.
Figure 2:
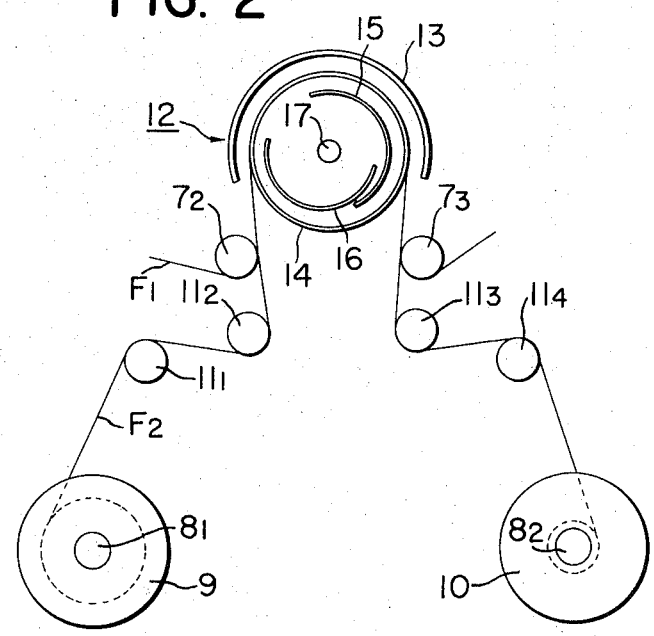
FIG. 2 is an enlarged view partly sectioned of the main part of FIG. 1.
Figure 3:
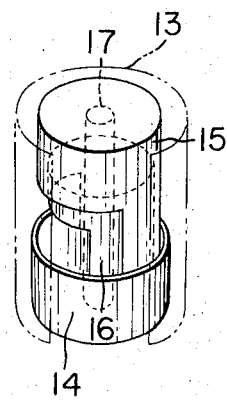
FIG. 3 is a perspective view of an exposure part shown in FIG. 1.

FIGS. 1 to 3 illustrate constructional views of a film reproduction device, in which an original film and a reproduction film are in contact to form a reproduced image on the reproduction film. In FIG. 1, there is shown a basic case 1 for a vertically disposed reproduction device. A front panel 2 is mounted frontwardly of said case 1. A friction shaft 3 is placed for receiving a given friction from the friction mechanism not shown and rotatably supported on said panel 2. A turn table 4 for feeding reproduction films is mounted on said friction shaft 3 for winding unsensitive reproduction film $F_1$ such as diazo film, bubble microfilm (Kalver film) and the like. A take-up shaft 5, which is driven by means of a film-take-up motor (not shown) arranged within said case 1 and is supported on the panel 2, and a turn table 6 for taking-up the reproduction film $F_1$ is mounted on said take-up shaft 5. Guide rollers $7_1$ to $7_4$ are rotatably mounted for guiding the reproduction film. A driving shaft $8_1$ is arranged in the case 1 and driven by means of a first driving motor which runs in a counterclockwise or clockwise direction as described hereinafter. A turn table 9 for feeding an original film $F_2$ is mounted on said driving shaft $8_1$. A take-up driving shaft $8_2$ is arranged in the case 1 and driven by means of a second driving motor which runs in a direction reverse to that of said first driving motor, and a turn table 10 for taking-up the original film $F_2$ is mounted on said take-up driving shaft $8_2$. Guide rollers $11_1$ to $11_4$ are rotatably mounted for guiding the original film. The first and second driving motors have their driving torque equalized by a driving control circuit, hereinafter described, during the stoppage of the reproduction operation. The driving torque of the first driving motor is controlled so that it is smaller than the driving torque of the second driving motor during the time of the reproduction operation. An exposure part 12 is specifically shown in FIG. 2 and FIG. 3. The exposure part 12 is surrounded by a cylindrical douser 13 and is opened in the position opposite to the guide rollers $7_2$ and $7_3$. Arranged coaxially to said douser 13 is a transparent heat insulating glass cylinder 14 made of for example Pyrex Glass (Trade Mark), and films $F_1$ and $F_2$ are guided and wound on the cylinder 14 in contact condition. Stop cylinders 15 and 16 are respectively arranged coaxially to the cylinder 14 within said cylinder, and the respective lower halves thereof are cut to form openings. The relative position between openings of both cylinders can be varied by turning said cylinder 15 from the outside to vary the width of a slit formed by said openings. An exposure light source 17 is arranged within the cylinder 16. An ultraviolet light source such as a xenon tube may preferably be used as the source 17 when diazo film, such as Kalver film, is used as a reproduction film. Turning now to FIG. 1, there is shown a developing part 18, which encases a heating drum 19 having a heater block. The reproduction film $F_1$, having received the exposure at the exposure part 12, is guided by being pressed on the peripheral edge of said drum, to apply thermal development to said film $F_1$. The reference character 20 shows a capstan roller driven by the film driving motor arranged within the case 1. A pinch roller 21 is rotatably mounted to press the reproduction film $F_1$ against the capstan roller 20. This film driving motor also serves to drive the thermal developing drum 19. Cylindrical cooling rollers 22 and 23 are hollow, respectively, and have their head portions provided with a plurality of openings. Outside air is absorbed from said openings in each roller into the lower surface of the panel 2, where the aforesaid rollers are mounted, by a blower driven by means of a motor, not shown, so that the cooling efficiency of film may be enhanced. On the front operating surface of the panel 2 there is provided a group of operating switches 24 to 28.

The original film $F_2$ and the reproduction film $F_1$ are guided in contact condition only at the exposure part 12 and they are guided in such a manner that an image of an information coma recorded on the original film $F_2$ is reproduced on the reproduction film $F_1$.

When the power switch 24 is put into the "on" position, a driving current is applied to the electric circuit within the device to drive the blower for the cooling rollers. When both rotary switches 25 and 26 are set, the first driving motor and the second driving motor cause the original film $F_2$ to be driven in a direction as indicated by arrow $T_1$ and in a direction as indicated by arrow $T_2$, by the driving control circuit hereinafter described. However, since the driving torque for both driving motors are equal during the stoppage of the reproduction operation, the original film remains stationary between the turn tables 9 and 10 in a stretching condition with suitable tension being obtained. When the take-up switch 27 is put into the "on" position and the speed control dial 28 is set in a suitable position, film driving motor (not shown) and the like are driven at a high speed to rotate the heating drum 19 and the reproduction film take-up turn table 5. In this case, by means of the driving control circuit, hereinafter described, in interlocking relation with the speed control dial 28, the driving torque of the first driving motor which drives the driving shaft $8_1$, becomes smaller than the driving torque of the second driving motor for the driving shaft $8_2$. Therefore, the follow characteristics of the original film $F_2$ relative to the reproduction film $F_1$ is enhanced so that both films are caused to travel at the same speed. The reproduction film $F_1$ is then wound on the take-up turn table 6 passing through the exposure part 12, thermal developing part 18, and cooling rollers 22 and 23.

Figure 5:
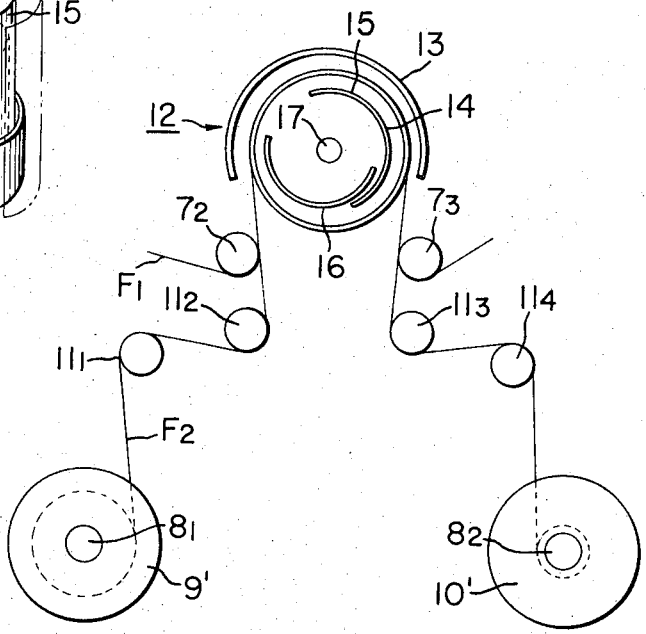
FIG. 5 is a schematic view of the main part illustrating another form of the invention.
Figure 4:
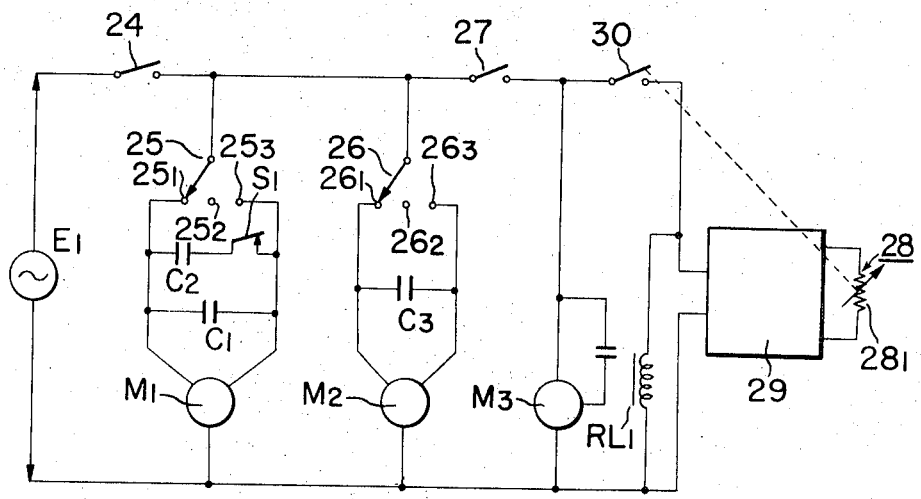
FIG. 4 is a diagram showing the electrical circuit of a driving control circuit in the embodiment as shown in FIG. 1.

In FIG. 4 there is shown a driving control circuit for a driving motor controlled by a speed control dial 28. There is specifically shown a commercial AC power source $E_1$, a first driving motor at $M_1$ for driving the driving shaft $8_1$ of the original film $F_2$, a second driving motor at $M_2$ for driving the driving shaft $8_2$, a take-up motor at $M_3$ for the take-up shaft 5 of the reproduction film $F_1$, and speed control means at 29 for a film driving motor (not shown) which drives the capstan roller 20 and the heating drum 19. The speed control means 29 is adapted to be controlled by a variable resistance $28_1$ on the speed control dial 28. The reference character 30 designates a switch which is opened and closed in interlocking relation with the variable resistance $28_1$. $RL_1$ is a relay controlled by said switch 30. $C_1$ and $C_2$ are capacitors connected in parallel with the auxiliary windings of the first driving motor $M_1$, and $C_3$ is a capacitor connected in series with the auxiliary winding of the second driving motor $M_2$, and $S_1$ is a normally closed switch connected in series with said capacitor $C_2$ and adapted to be opened by excitation of the relay $RL_1$. If a capacitor, having suitable capacity, is connected to the auxiliary winding of an induction motor, a current for the auxiliary winding of said motor can be led in phase with respect to the current of the main winding. Therefore, a greater starting torque is obtained than that of a motor not having the auxiliary winding connected to the capacitor. This fact is a well known fact. In the invention, the effective capacity of the capacitor for the first driving motor $M_1$ can be varied by opening and closing the switch $S_1$. In FIG. 4, the sum of capacities of the capacitors $C_1$ and $C_2$ for the first driving motor $M_1$ is equal to the capacity of the capacitor $C_3$ for the first driving motor. Thus, in the closed condition (as shown in FIG. 4) of the switch $S_1$, the driving torque of the first driving motor $M_1$ is set equal to that of the second driving motor $M_2$. The numerals $25_1$, $25_2$, and $25_3$ show contacts for the rotary switch 25. When the contact piece is connected to contact $25_1$ (in the position as shown in FIG. 4), the first driving motor $M_1$ causes the driving shaft $8_1$ to be driven in a counterclockwise direction, and when the contact piece is connected to contact $25_2$, the motor $M_1$ is stopped, and when the contact piece is connected to contact $25_3$, the motor $M_1$ causes the driving shaft $8_1$ to be driven in a clockwise direction. The numerals $26_1$, $26_2$, and $26_3$ show contacts for the rotary switch 26, and in a manner similar to the foregoing, the second driving motor $M_2$ causes the driving shaft $8_2$ to be driven in a clockwise direction when in the position of contact $26_1$ (as shown in FIG. 4), the and motor is stopped when in the position of contact $26_2$, and the motor causes the driving shaft $8_2$ to be driven in a counterclockwise direction when in the position of contact $26_3$. When the original film is wound on both turn tables 9 and 10 as shown in FIG. 2, respective contact pieces for motors $M_1$ and $M_2$ are connected to contacts $25_1$ and $26_1$ (in the positions shown in FIG. 4). When the original film is wound on both turn tables 9' and 10', as shown in FIG. 5 which illustrates another form of embodiment, respective contact pieces for both motors $M_1$ and $M_2$ can be connected to contacts $25_3$ and $26_3$.

With the foregoing construction in mind, when the power switch 24 is first closed, respective contact pieces for rotary switches 25 and 26 are set to the contacts $25_1$ and $26_1$, and the take-up switch 27 is closed, the speed control dial is in "O" position, the film driving motor is not actuated, the capstan roller 20 is stopped, the switch 30 is in open condition, and the realy $RL_1$ is not excited. Accordingly, when the switch $S_1$ is in closed condition, the driving force is applied to the film by the first driving motor $M_1$ so as to cause the original film $F_1$ to be driven in a direction as indicated by arrow $T_1$, while the driving force is applied to the film by the second driving motor $M_2$ so as to cause the original film $F_1$ to be driven in a direction as indicated by arrow $T_2$, but since the driving torque of motor $M_1$ is equal to that of motor $M_2$ the loads applied to both motors are the same. Accordingly, the original film $F_2$ remains stationary between the turn tables 9 and 10 and is stretched with a suitable tension. The reproduction film take-up motor $M_3$ is driven by closing the take-up switch 27 and the reproduction film is stretched with a suitable tension. In this condition, however, the capstan roller 20 and the heating drum 19 are not driven because the control dial 28 is in "O" position, and both films $F_1$ and $F_2$ remain stationary at the exposure part 12 in contact condition. Next, the control dial 28 is turned to vary the variable resistance $28_1$ so that the speed of the film may be controlled. By this operation, the capstan roller 20 and the heating drum 19 are driven at a high controlled speed by the speed control means, and the reproduction film $F_1$ is transported by means of the capstan roller 20 and pinch roller 21. At the same time, the original film $F_2$ is transported followed by the reproduction film. At this time, the switch 30 is closed as it is interlocked with the variable resistance $28_1$ to excite the relay $RL_1$, so that the normally closed switch $S_1$ is opened and the driving torque of the first driving motor $M_1$ becomes smaller than the driving torque of the second driving motor $M_2$. Therefore, the load by the driving torque of the first driving motor $M_1$ is relieved as the film $F_2$ is transported so that the following of the original film $F_2$ relative to the reproduction film $F_1$ may be enhanced. Consequently, both films $F_1$ and $F_2$ are transported at the same speed, thereby avoiding a double-image during reproduction operation at high speed. When the reproduction operation is desired to be stopped, the speed control dial is positioned at "O" so the capstan roller 20 and the heating drum 19 are stopped and at the same time the switch 30 is opened to de-excite the relay $RL_1$. Accordingly, the switch $S_1$ is closed to maintain the torque of both motors $M_1$ and $M_2$ equal, thus stopping both films.

Figure 6:
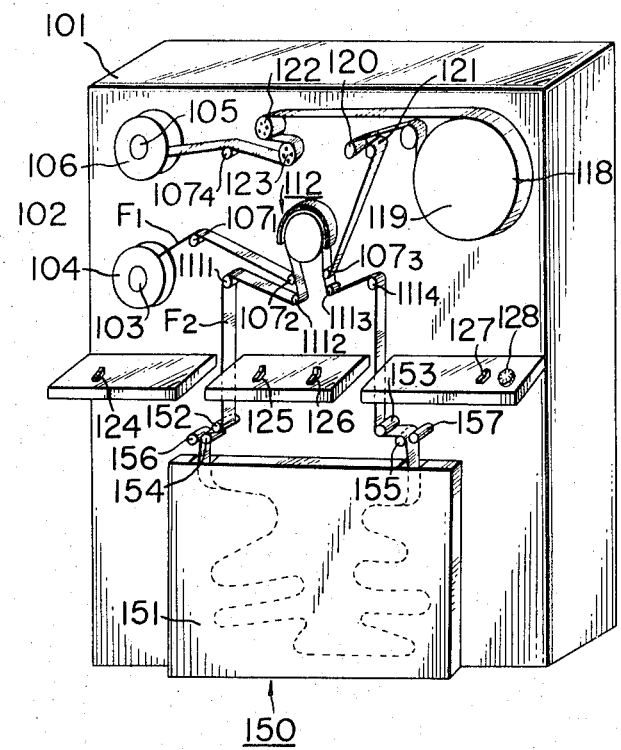
FIG. 6 is a perspective view of the device illustrating a further embodiment of the invention.
Figure 7:
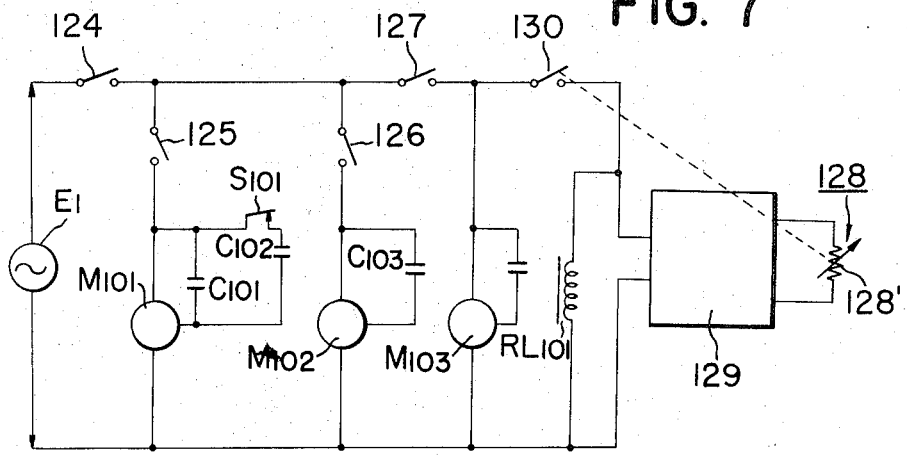
FIG. 7 is a diagram showing the electrical circuit of a driving circuit in the embodiment as shown in FIG. 6.

FIG. 6 illustrates another embodiment of the invention in which both ends of the original film are connected to form an endless film. In the drawing, similar elements are given similar reference characters with the numeral 100 added. In FIG. 6, there is shown a loop unit as at 150, having a case 151 enclosing a loop of the original film $F_2$ that is covered with teflon (Trade Mark) so as not to damage the film. There is shown original film guide rollers 152 and 153, driving rollers at 154 and 155 arranged above the upper opening of the case 151 and driven by means of a separate motor hereinafter described, and pinch rollers 156 and 157 pressed against the driving rollers 154 and 155 for holding the film in a pressed condition therebetween, respectively. In FIG. 7, there is shown a driving control circuit for the motor. In FIG. 7, $M_{101}$ is a first motor to drive a capstan roller 154 and, $M_{102}$ is a second motor to drive a capstan roller 155, and $M_{103}$ is a take-up motor to drive a reproduction film F take-up shaft 105. The difference between the embodiment of FIG. 7 and the aforesaid embodiment resides in the provision of switches 125 and 126 instead of the foregoing rotary switches. If the film is of the endless type, it is not necessary to change-over the rotating directions of both of the motors $M_{101}$ and $M_{102}$.

As is evident from the construction as described above, even if the original film is made in endless form, the follow characteristics of the original film relative to the reproduction film is enhanced during the reproduction operation and there is no fear of producing a double-image on the reproduction film.

As described above, the present invention makes it possible to eliminate the formation of a double-image on the reproduction film caused by displacement between reproduction film and the original film during the reproduction even when operating at a high speed, and provides an effective driving system for a high speed reproduction device.

We claim:

1. A film reproduction device for continuously transporting an original film having an image thereon and an unexposed reproduction film in order to reproduce an image of the original film on the reproduction film comprising:

exposure means for exposing the image of the original film on the reproduction film to reproduce said image on the reproduction film;

feeding means for transporting (the original film and) the reproduction film in a transporting direction into said exposure means;

first drive means mounted frontwardly of said exposure means with respect to the direction of transporting the reproduction film and applying the driving force by which said original film is driven in a direction which is the reverse of said transporting direction of the reproduction film;

second drive means mounted rearwardly of said exposure means with respect to the direction of transporting the reproduction film and applying the driving force by which said original film is driven in said transporting direction;

drive control means which is interlocked with said feeding means and which equalizes the driving forces of both drive means during the stoppage of transporting of the original and reproduction films and makes the driving force of the first driving means smaller than that of the second driving means during the time of transporting the original film, whereby the original film remains stationary with an obtained suitable tension during the stoppage of the reproduction operation and the original film and the reproduction film are transported during the reproduction operation, and means for contacting the original film with the reproduction film.

2. A film reproduction device as defined in claim 1 wherein said first drive means comprises feed means for winding the original film and a first driving motor having a suitable driving torque to drive said last-mentioned feed means, said second drive means comprises take-up means for winding the original film and a second driving motor having a suitable driving torque to drive said take-up means, whereby said control means sets the driving torques of said first driving motor and said second driving motor so that they are equal during the stoppage of transporting of the original and reproduction films while setting the driving torque of said first driving motor so that it is smaller than the driving torque of said second driving motor during the time of transporting of the original film.

3. A film reproduction device as defined in claim 2 wherein said first driving motor has at least two capacitors connected to its auxiliary winding, said second driving motor has a capacitor connected to its auxiliary winding and having a capacity equal to the sum of the capacities of capacitors of said first driving motor, and said control means comprises a relay operated by said first-mentioned feed means and a switch of said relay for varying the capacity of the capacitors for said first driving motor, whereby said control means sets the capacities of the capacitors for both driving motors so that they are equal during the stoppage of transporting of the original and reproduction films while varying the capacitor capacity for said first driving motor so that it is smaller than the capacitor capacity for said second driving motor during the time of transporting of the original film, and transporting the original film and the reproduction film at the same speed during the reproduction operation.

4. A film reproduction device as defined in claim 1 wherein said first driving means and said second driving means have a pair of capstan roller and pinch roller, respectively, which hold the original film therebetween in a pressed condition, the capstan roller of said first driving means being connected to a first motor having a suitable driving torque and the capstan roller of said second driving means being connected to a second motor having a suitable driving torque, and further said control means setting the driving torques of both motors so that they are equal during the stoppage of transporting of the original and reproduction films and setting the driving torque of said first motor so that it is smaller than the torque of said second motor during the time of transporting of the original film.

5. A film reproduction device as defined in claim 4 wherein said first motor has at least two capacitors connected in parallel with its auxiliary winding, said second motor has a capacitor connected to its auxiliary winding and having the capacity equal to that of said first motor, and said control means having switch means for varying the capacity of the capacitors for said first motor in interlocked with said feeding means.

* * * * *